Aug. 5, 1958

E. R. KITCHEL 2,845,977

CRESCENT-SHAPED NUT RETAINER FOR NUTS
USED IN HEAVY INDUSTRIAL EQUIPMENT
Filed July 27, 1956

INVENTOR.
Eugene R. Kitchel
BY
Bacon & Thomas
ATTORNEYS

2,845,977
CRESCENT-SHAPED NUT RETAINER FOR NUTS USED IN HEAVY INDUSTRIAL EQUIPMENT

Eugene R. Kitchel, Miami, Fla.

Application July 27, 1956, Serial No. 600,625

1 Claim. (Cl. 151—29)

This invention relates to nut locks and particularly to locking devices for threaded nuts, which may be applied to the nut and bolt assembly entirely from one side thereof and without the necessity of having access to the end of the bolt.

The invention comprises a non-circular, preferably generally square, section of a bolt closely adjacent one end face of a nut threaded thereon. A generally crescent shaped locking element, with its concave edge formed complementary to a portion of the non-circular bolt section, lies against the adjacent end face of the nut with its concave edge in locking engagement with the bolt and is provided with an axially extending lug or ear lying in a radial recess in the periphery of the nut. Suitable securing means secure the locking element to the nut and thus prevent turning of the nut relative to the bolt.

It is therefore an object of this invention to provide a nut lock that is extremely simple in construction, inexpensive to manufacture and assemble and easy to apply.

Another object of this invention is to provide a nut lock secure and dependable in operation and yet readily removable.

Still another object of the invention is to provide a novel nut lock readily adaptable to any nut-bolt assembly.

A further object of the invention is to provide an efficient nut lock that can be applied to the nut and bolt assembly entirely from one side thereof without requiring access to the end of the bolt.

Additional and further objects and advantages will become apparent to those skilled in the art as the description proceeds in connection with the accompanying drawing, wherein.

Figure 2:
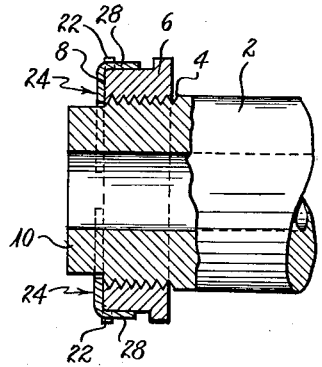
Fig. 2 is a fragmentary sectional view taken substantially along the line 2—2 of Fig. 1.
Figure 4:
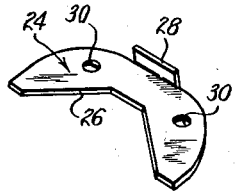
Fig. 4 is a perspective view of one of the locking elements of the present invention.

Referring first to Fig. 2, numeral 2 indicates the bolt element of the present invention. As shown in that figure the bolt comprises a hollow tubular structure which, in this particular form, is a center pin for a Lima drag line. However, the form of bolt shown is merely for purpose of illustration and the invention is readily adaptable to any type of nut and bolt assembly.

The bolt member 2 is provided with external threads 4, threadedly receiving a suitable nut 6 having an end face 8 substantially perpendicular to the axes of the nut and bolt. With the nut 6 threaded to the position of Fig. 2 an end portion 10 of the bolt projects outwardly therebeyond. The end portion 10 is preferably formed so as to have a non-circular cross-section, preferably by forming flat surfaces 12 (see Fig. 1) thereon in diametrically opposed relation. The surfaces 12 are preferably chordally arranged leaving the threaded portions 14 at the apexes of the generally square bolt section. The threaded apexes 14 assist in guiding the nut 6 onto the fully threaded portion of the bolt, although the threads at 14 could be cut away, if desired, without affecting the principles of the invention.

Figure 1:
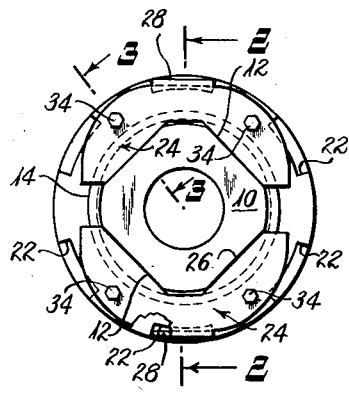
Fig. 1 is an end elevational view of the nut lock of the present invention applied to a nut and bolt assembly, with portions broken away.
Figure 3:
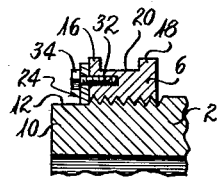
Fig. 3 is a further fragmentary sectional view taken substantially along the line 3—3 of Fig. 1.

The nut 6 may be formed as a generally cylindrical member having a circular periphery but provided with radially extending flanges 16 and 18 (Fig. 3) with a circumferential channel 20 extending therearound between flanges 16 and 18. The flange 16 is provided with a plurality of circumferentially spaced radial notches 22 (Fig. 1). A suitable wrench or like tool (not shown) may be employed to tighten the nut 6 on the bolt 2 by engagement with the notches 22.

The nut lock of the present invention comprises a generally crescent shaped element 24 having its concave edge formed generally in the shape of a V-notch 26. The V-notch need not extend to a sharp apex but may be truncated as clearly shown in the drawings. The notch 26 is so configurated that its edge portions abut adjacent surfaces 12 of the bolt when the locking element overlies the end face 8 of the nut in the manner shown in the drawings. The overall outline of the element 24 is preferably such that it lies substantially entirely within the outline of the end face 8 of nut 6. The element 24 is further provided with an axially extending ear or lug 28 at its outer periphery, the ear or lug 28 being of such size and dimension as to be readily received within one of the notches 22 without undue play or looseness.

The element 24 is provided with one or more openings 30 therethrough, and the nut 6 is provided with a series of threaded openings 32 (Fig. 3) therein aligned with the openings 30 when the locking element 24 is in its nut-locking position. A suitable threaded cap screw 34 extends through each of the openings 30 and threadedly engages the threaded openings 32 to thereby securely fasten the locking element 24 to the end face 8 of nut 6 and thereby securely lock the nut against turning movement on the bolt 2.

As clearly shown in Fig. 1, the arrangement preferably comprises a pair of diametrically opposed locking elements 24 whereby the arrangement will resist greater turning force on the nut 6 than would be possible if only a single locking element were employed.

The drawings show the locking element 24 as being of a relatively thin sheet of metal with the ear or lug 28 formed integrally therewith. In many installations, involving large nuts and bolts the locking element may more practically be made of heavy sheet metal of such thickness that it would be impractical to bend the ear or lug 28 therefrom, in which instance the lug 28 may be a separate member welded to the peripheral edge of the locking element. Likewise, in some installations the nut 6 may be of such relatively small size that it would be impractical to provide threaded openings 32 therein, in which case plain cylindrical openings are provided and friction pins corresponding to the cap screws 34 may be used to enter the opening with a drive fit and thereby secure the locking elements to the nut frictionally.

By the structure described, the nut 6 may be locked in position intermediate the ends of a relatively long rod or bolt member and it is thus necessary to provide the flat surfaces 12 only adjacent the desired position of the nut without running those surfaces completely to the end of the bolt member. The particular shape of the locking element renders it readily applicable in such a situation since it may be readily applied to the nut entirely from one side of the nut and bolt assembly without having to pass or slip the same over an end of the bolt.

While a single specific embodiment of the invention has been shown and described herein it is to be understood that the description and drawings are merely illustrative and not limiting. It is contemplated that the invention encompass other modifications falling within the scope of the appended claim.

I claim:

In a nut lock for large nuts on heavy industrial equipment; a bolt having a threaded portion, a nut threaded on said portion, said nut having a flat upper surface and radial flange flush with said upper surface, said radial flange having peripheral notches therein, said bolt being of generally square section adjacent said surface of said nut, a pair of diametrically opposed flat steel locking elements, each of said elements overlying said surface of said nut and being of crescent shape with a generally V-shaped notch at its inner edge embracing a corner portion of said generally square section of said bolt whereby it may be applied to said nut and bolt entirely from one side thereof, said elements lying within the outline of said nut and each having a downwardly extending lug welded to the outer edge portion thereof and nested within a notch in said flange, each of said elements being fixedly secured to said nut by threaded fastening means extending through said element and into said nut.

References Cited in the file of this patent

UNITED STATES PATENTS

| 245,733 | Long | Aug. 16, 1881 |
| 906,476 | Ullmann | Dec. 8, 1908 |
| 1,317,567 | Fewster | Sept. 30, 1919 |
| 1,431,459 | Hardie | Oct. 10, 1922 |
| 2,101,678 | Herschmann | Dec. 7, 1937 |

OTHER REFERENCES

Ser. No. 406,374, E. Rudiger (A. P. C.), published June 1, 1943.